May 22, 1934.  K. E. LUNDBERG  1,959,983
TEMPERATURE CONTROL APPARATUS FOR FURNACES
Filed Nov. 18, 1931
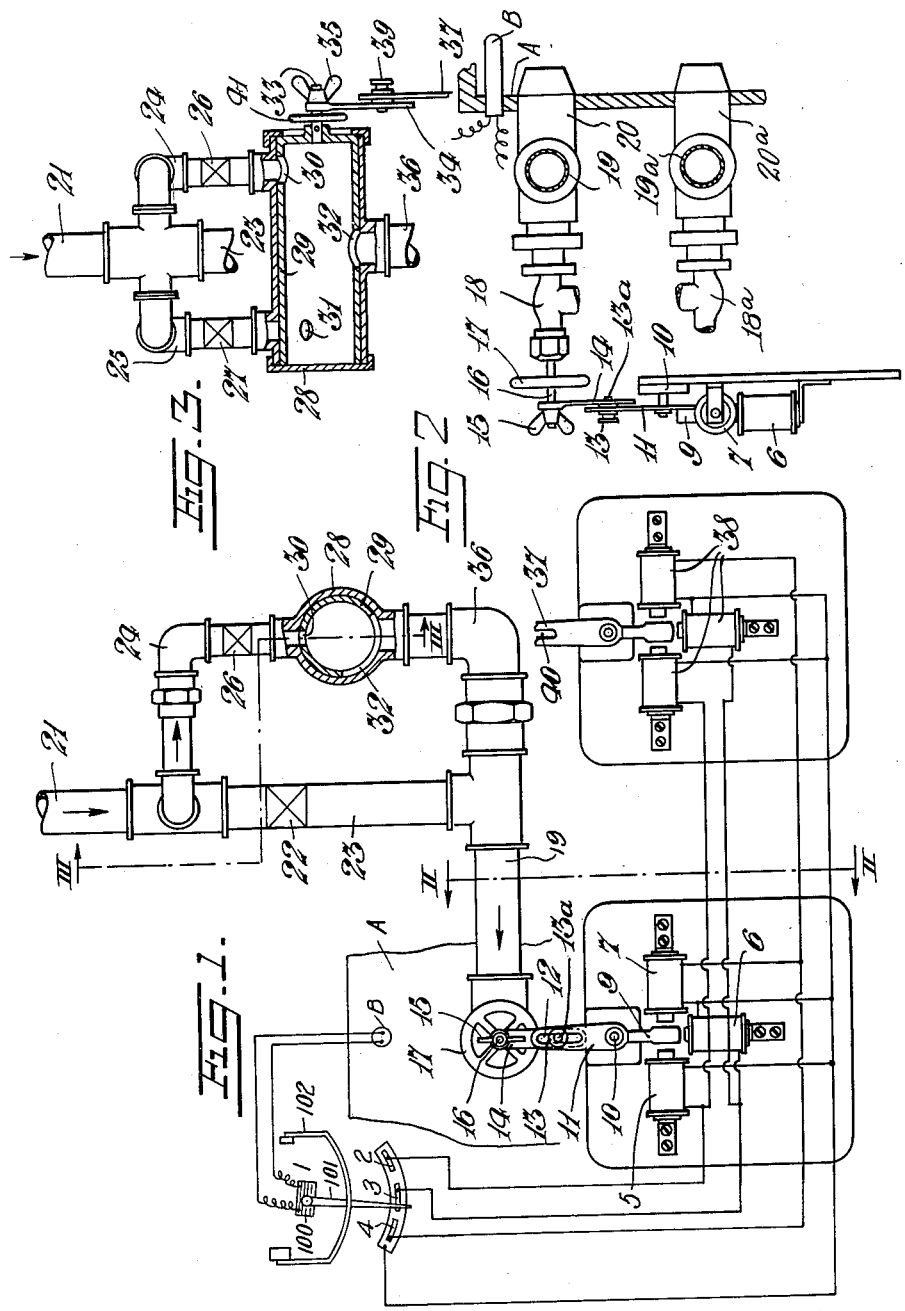

Patented May 22, 1934

1,959,983

UNITED STATES PATENT OFFICE 1,959,983

TEMPERATURE-CONTROL APPARATUS FOR FURNACES

Karl Einar Lundberg, Uppsala, Sweden

Application November 18, 1931, Serial No. 575,893
In Sweden November 22, 1930

11 Claims. (Cl. 236—70)

This invention relates to furnaces heated with a gaseous or liquid fuel, and refers more particularly to an apparatus for regulating or controlling the temperature in such furnaces to a substantially constant value.

In the electric or electro-mechanical devices heretofore used for this purpose there is no means provided for adjusting the mechanical parts in relation to the electrical parts and for this reason these prior devices have a very limited use and are not fit for many purposes, for which a good adjustability is important.

The object of this invention is, chiefly, to provide a controlling apparatus effecting an automatic control of the temperature of the furnaces within narrow limits.

Another object of this invention is to make the mechanical controlling means adjustable in relation to the electric means in such manner, that the limits of temperature may be adjusted or set as desired and that the mean or average temperature of the furnace may be chosen as desired. Consequently the controlling action may be determined so as to cause as small variations of temperature in the furnace as possible. This implies also that the furnace may be adapted to respond to various different conditions of operation by use of one and the same controlling device. Thus, the electrical and the mechanical means may be set in relation to each other to cooperate in the best manner in each individual case.

A further object of this invention is to provide a new and useful construction of said mechanical means so as to render an easy and secure control of the fluid fuel and air supplied possible.

In one preferred embodiment of the invention the apparatus has three controlling positions, viz. for the normal, the minimum and the maximum temperatures. The apparatus may however also be provided with only two such positions, viz. for the minimum and the maximum temperatures, or may have a greater number of such positions, viz. two extreme positions and any desired number of intermediate positions. As a rule, however, two or three positions are sufficient and will give the best results.

One preferred embodiment of the invention is shown in the annexed drawing.

Fig. 1 shows, partially in cross section, an elevation of a controlling device for a furnace in accordance with this invention.

Fig. 2 is a section on the line II—II in Fig. 1 and

Fig. 3 is a section on the broken line III—III in Fig. 1.

Referring now to the drawing A indicates a furnace in which a temperature responsive member B, such as a thermostatic pyrometer, is inserted. Said member B is electrically connected with a temperature-measuring device 1 of any well-known or suitable construction, such as a Siemens temperature meter of the drop bow type. The device 1 is provided with three electric contacts 2, 3, 4 corresponding successively to the minimum, the normal and the maximum temperatures, and comprises an oscillating coil 100 operated by the electromotive forces generated in the device B. A pointer 101, carried by said coil, moves above the three contacts 2, 3 and 4 and is intermittently depressed by a dropping bow 102 for closing any of said contacts. If desired, the three contacts 2, 3, 4 may be closed by different thermostatic pyrometers, responsive to the minimum, the normal and the maximum temperature in such manner, that only one of said contacts is closed simultaneously, but always one contact is closed. By preference, the contacts 2, 3, 4 are closed intermittently. The minimum contact 2 and the maximum contact 4 are adjustable along a scale (not shown) graduated, for instance, in centigrades, so as to permit a determination of the lower and the upper limits of the temperature interval to any values desired. If desired, the normal or mean contact 3 may also be adjustable. The three contacts 2, 3, 4 are closed alternately in such manner, that the contact 2 is closed, when the permissible maximum temperature is reached or exceeded and the contact 4 is closed, when the temperature falls to or below the permissible minimum temperature, while the contact 3 is closed in all other cases, i. e. for temperatures within the range permitted. The contacts are closed at equal intervals in such manner, that only one and always one of the contacts is closed, which may be performed in well-known manner by means of the index or pointer 101 actuated by the dropping bow or depressor 102, which falls and is raised again at equal intervals. Evidently, the parts B, 1, 2, 3 and 4 together form a contact-making device responsive to the temperature of the furnace.

The three contacts, 2, 3, 4 are each connected with an electro-magnet 5, 6, 7 in such manner, that a current from a battery 8 is closed through one of said electro-magnets, when the corresponding contact is closed. The three electromagnets have a common armature 9, which is rotatably journalled on a shaft or journal 10 and carries an arm 11 above said shaft. In the arm 11 a longitudinal slot 12 is cut which is engaged by a bolt 13a, which may be locked in any position desired in said slot 12 by means of a milled nut 13. One end of said bolt extends freely into a longitudinal slot of an arm 14, which may be rigidly secured to a spindle 16 by means of a wing nut 15. Said spindle, on which a hand wheel 17 is rigidly secured to be actuated by hand, is operatively connected with a feed valve for the fuel. For instance, a needle valve in the fuel supply pipe 18 may be actuated by said spindle 16 to control the quantity of gaseous or liquid fuel supplied through said pipe 18 to the burner 20.

A pipe 19 for supplying the air necessary for the combustion discharges into the burner 20 together with the fuel supply pipe 18. In the air pipe 19 a controlling device for the air for the combustion is arranged, which will now be described:

The pipe 21 is connected with a fan (not shown) of any suitable construction or any other source of air under pressure, delivering the air necessary for the combustion. The pipe 21 is branched into three branch pipes, viz. first the pass-by pipe 23 discharging into the pipe 19 and provided with a valve 22 adjustable by hand, secondly the two pipes 24, 25 each containing a valve 26, 27 adjustable by hand. After said valves the pipes 24, 25 discharge into a common valve box 28. In said box a hollow cylindrical drum 29 (cock-plug) is rotatably journalled, said drum being provided with two inlet openings 30 and 31, one for each of the two pipes 24 and 25 and further a larger, common outlet opening 32. The inlet openings 30 and 31 are displaced in relation to each other in the peripheral direction of the drum 29, so that the air current through the pipes 24, 25 may pass through either of said two inlet openings 30, 31 or is completely cut off. The aperture 32 always registers with the outlet pipe 36 leading to the pipe 19.

The drum 29 may be rotated by means of a spindle 33 rigidly secured thereto. The spindle 33 penetrates a hole of an arm 34 which may be secured to the spindle by means of a wing nut 35. The parts 33—35 are quite analogous to the parts 14—16 and are automatically controlled by a second set of relays 38 analogous to the set of relays 5, 6, 7 and connected in parallel to said last-mentioned set of relays and carrying on its common armature an arm 37 analogous to the arm 16 and said arm 37 is provided with a longitudinal slot 40 and connected with the arm 34 by means of a bolt, carrying a wing nut 39. Said bolt extends freely into a longitudinal slot of the arm 34 and may be secured in any position desired in the slot 40 by means of the nut 39. The two mechanisms 5—16 and 33—35, 37—40 are of similar construction and have the same mode of operation.

The furnace A may also be provided with a second burner 20a having a fuel supply pipe 18a and an air supply pipe 19a. This burner is provided with separate control devices of the same construction as those described above for the burner 20.

The device described acts as follows:

When the furnace, heated from the burner 20 shall be ignited, the two wing nuts 15 and 35 are loosened to disconnect the arms 14 and 34 from the spindles 16 and 33, respectively. Oil or other liquid or gaseous fuel and air for the combustion are let in by hand by means of the hand wheel 17 and a corresponding hand wheel 41 on the air supply pipe and the temperature is regulated by hand by means of said two hand wheels until the temperature desired is attained, which may be established by means of a thermometer or pyrometer in well-known manner. At this moment the arms 14 and 34 are locked to the spindles 16 and 33 by turning the wing nuts 15 and 35 by hand, while observing, that said two arms shall be in their middle position, i. e. that the armature 9 is just in front of the coil 6 and the corresponding armature of the second set 38 of relays is just in front of the middle of said latter relays. After this operation the heating is controlled automatically in the following manner:

When the temperature in the furnace is raised to or exceeds the predetermined maximum value the contact 4 is closed to energize the coil 7 which will then attract the armature 9. The partial rotation of the arm 11 thus originated is transmitted via the bolt 13a and the arm 14 to the spindle 16 causing the latter to throttle the fuel supply pipe to reduce the quantity of fuel supplied per unit of time. Simultaneously the spindle 33 is rotated a certain angle as a result of the energization of a corresponding relay of the set 38, thus causing the drum 29 to close the pipes 24 and 25, i. e. said drum is rotated in such direction that the openings 30, 31 are turned out of register with the pipes 24, 25. Consequently, the air of combustion may pass through the pipe 23 only in which the valve 22 should be adjusted in advance in such manner, that the quantity of air passing through said latter valve per unit of time is just sufficient for combusting the quantity of oil simultaneously supplied from the throttled fuel supply pipe. The quantities of oil (or other fuel) and air supplied per unit of time now have their minimum values, said values being chosen in such manner that the temperature of the furnace falls.

As soon as the temperature of the furnace has fallen sufficiently it will be the contact 3 that is closed at the next contact-making operation, thus energizing the magnet 6 (and simultaneously de-energizing the coil 7). Consequently the armature 9 is returned to its central or normal position, while the spindle 16 is turned a corresponding angle so as to increase the quantity of oil supplied to the burner 20 per unit of time. Simultaneously the spindle 33 is turned by the action of the corresponding relay of the set 38 so as to bring the opening or aperture 30 to register with the pipe 24. An additional current of air determined in advance to a suitable value by aid of the valve 26, will then flow through pipe 24, aperture 30, hollow interior of drum 29 and aperture 32 to pipe 36 and flow into pipe 19 together with the constant current of air supplied from the pipe 23. The total quantity of air from the pipes 23 and 36 shall then be just sufficient to combust completely the quantity of oil fed from the pipe 18 for the corresponding (normal) position of the fuel valve spindle 16. The quantities of air and fuel supplied now have their normal values.

If the temperature of the furnace falls down to or even below the permissible minimum temperature predetermined the contact 2 will be closed at the next contact-making operation so as to energize the magnet 5 to turn the spindle 16 an additional angle to increase the quantity of fuel supplied per unit of time. Simultaneously the spindle 33 is turned by a relay of the set 38 in such manner that the aperture 31 will register with the pipe 25, while simultaneously the outlet from the pipe 24 will be closed, because the aperture 30 is turned to cease to register with said pipe 24. Air for the combustion now flows to the pipe 19 from pipe 23 as well as from pipe 25. The valve 27 shall in advance be adjusted to such a position, that the total current of air from the pipes 23 and 25 is just sufficient to combust the quantity of fuel now supplied per unit of time. The quantities of fuel and air supplied now have their maximum values and said values shall be so high, that the temperature of the furnace is raised.

It is evident, that by setting the bolt 13 in different positions in the slot 12 the automatic control may be changed in as much as the spindle 16 is then turned a greater or smaller angle between the three positions (maximum, minimum and normal positions), i. e. in other words that the size of the control steps or intervals is changed. It is to be observed, that the step or distance in centigrades between the normal temperature on one hand and the maximum and minimum temperatures on the other hand may always be equal to each other, while their absolute value, i. e. the amplitude of the arm 14 is varied. In other words, the mechanical device may be adjusted to different amplitudes, while the electric device remains unaltered. By means of this adjustability the size or amplitude of the controlling motions and the changes caused by them may be regulated to agree with the intervals of temperature chosen and this fact renders it possible to effect a good automatic control and to keep the temperature of the furnace constant within very narrow limits. Consequently the apparatus may be advantageously used for great as well as for small intervals or control steps. As stated above the contacts 2, 3, 4 may also be adjustable to respond to different ranges of temperature. In this case it is also necessary that the mechanical supply controlling devices can be adjusted accordingly, because otherwise a good and even control cannot be attained.

It is also obvious from the statements above, that the control device described permits the mechanical devices to be set for any normal temperature, which may be attained by use of the burners in the furnace. It is evident, that the adjustability effected by the members 12—16 is necessary also for this purpose, because the normal or mean quantities of fuel and air then must be chosen to correspond to the new normal temperature. For this purpose the nuts 15 and 35 are loosened and the arms 14 and 34 locked to the spindles 16 and 33 in the new positions in which these new normal quantities are delivered.

The statements just made also apply to the adjustability of the members 33—35, 37—40.

The quantity of air necessary for various settings of the members 12—16 may also be regulated by adjusting the valves 22, 26 and 27 by hand.

It is obvious, that said latter valves may be adjusted also during the course of the automatic control, if necessary. The locking of the arm 14 to the spindle 16 and also of the arm 34 to the spindle 33 may also be changed during the operation of the furnace, if the adjustment first made should turn out to be less suitable.

In practical operation the device in accordance with this invention has turned out to be able to maintain the temperature of the furnace constant within narrow limits, which is very important particularly for metallurgical and other furnaces for industrial use.

If the furnace is provided with several burners a device in accordance with this invention may be used for each burner or a common control device may be used for several or all burners to control the common supply pipes for fuel and for air to them. When individual control devices for each burner are used, the further advantage is attained that the temperature in different parts or zones of the furnace may be regulated to different values, which is desirable in many cases.

Some modifications may be made in the embodiments shown and described without exceeding the scope of the invention. Thus, for instance, a common spindle may be substituted for the air and the fuel valves and in this case only one set of relays is necessary. Though three steps of regulation are quite sufficient for most practical purposes another number of such steps may be used, for instance, five, the number of relays being then increased accordingly. The air controlling device may be of another design. The drum 29 may for instance be provided with three openings having different peripheral length to cooperate with three inlet pipes for air in such manner, that one, two or three of said pipes are open in the three controlling positions. In this case the by-pass pipe 23 may be omitted.

What I claim is:—

1. In a temperature-control system, in combination with a burner, a supply pipe to said burner, a control valve in said pipe, an actuating member detachably and adjustably secured to said valve, an electric contact device responsive to the temperature generated by said burner, a set of relays connected with said contact device, a common armature for said set of relays, and an adjustable connection between said armature and said actuating member.

2. In a temperature-control apparatus, in combination with a burner, a supply pipe to said burner, a control valve in said pipe, an operating spindle on said valve, a lever detachably and adjustably secured to said spindle, a contact-making device actuated by the temperature generated by said burner, a set of relays connected with said contact-making device, a common armature for said set of relays, an arm on said armature connected at one end to said lever, and a pin engaging a slot in one of said members for adjusting the connection between said arm and lever.

3. In a temperature-control apparatus for furnaces, in combination with a burner, supply pipes for fuel and air to said burner, control valves in said pipes, threaded operating spindles on said valves, levers detachably and adjustably connected to said spindles, a contact-making device adapted to be actuated by the temperature of the furnace, a set of relays connected with said contact-making device, a common armature for each set of relays, an arm on each of said armatures connected at one end to one of said levers, and a pin engaging a slot in one of said members for adjusting the connection between said arm and lever.

4. In a furnace, in combination, a burner, a supply pipe for fuel to said burner, a fuel control valve in said fuel supply pipe, a three-branched air supply pipe to said burner, a common air control valve in two of said branch pipes, the third branch pipe being a by-pass pipe for the quantity of air necessary for the minimum temperature of the furnace, while the two other branch pipes have different areas of passage to supply either of the additional quantities of air necessary for the maximum and the normal temperatures of the furnace, a contact-actuating device having three contacts adapted to be actuated for the normal and the permissible maximum and minimum temperatures of the furnace, at least one set of relays connected with said contacts, a common armature for each of said sets, and adjustable connections between said armatures and said fuel and air control valves.

5. In a temperature-control device for a furnace, in combination, a burner, fuel and air supply pipes to said burner, control valves in said supply pipes, operating spindles on said valves, levers detachably and adjustably secured to said spindles, a contact-actuating device adapted to be actuated by the temperature of said furnace at least for the permissible maximum and minimum temperatures, relays electrically connected with said devices, common armatures for groups of said relays, arms on said armatures, longitudinal slots in said levers and said arms, pins engaging said slots, and means for securing said pins detachably in any position in said slots.

6. In a temperature-control system for a furnace, having a burner for a fluid fuel, in combination, a fuel supply pipe to said burner, a fuel control valve in said pipe, a three-branched air supply pipe to said burner, a common air-control valve in two of said branch pipes, the third branch pipe being a by-pass pipe to supply the quantity of air necessary to combust the minimum quantity of fuel simultaneously supplied to said burner, while the other two branch pipes are adapted to supply the additional quantities of air necessary for the combustion of the maximum and the normal quantities of fuel simultaneously supplied to said burner, a contact-making device having three contacts responsive to the normal and the permissible maximum and minimum temperatures of the furnace, at least one set of relays connected with said contacts, a common armature for each of said sets, adjustable and detachable connections between said armatures and said fuel valve and said air valve, and additional manually adjustable throttling valves in said three branch pipes to determine their maximum areas of passage.

7. In a temperature-control system for a furnace having a burner for a combustible fluid, in combination, a fuel supply pipe to said burner, a fuel-control valve in said pipe, an operating spindle on said valve, a lever detachably and adjustably connected with said spindle, a contact device responsive to the temperature of said furnace, a set of relays electrically connected with said contact device, a common armature for said set of relays, and an adjustable connection between said lever and said armature to permit variation of the effective length of said lever.

8. In a temperature-control system for a furnace having a plurality of burners, in combination for at least one burner, a supply pipe to said burner, a control valve in said pipe, an actuating spindle on said valve, a lever detachably and adjustably secured to said spindle, a contact-actuating device responsive to the temperature of said furnace, a set of relays connected with said contact-actuating device, an armature for said set of relays, and an adjustable connection between said lever and said armature.

9. In a temperature-control system for a furnace having a plurality of burners, in combination for at least one burner, a supply pipe, a control valve in said pipe, an operating spindle on said valve, a lever detachably and adjustably secured to said spindle, a contact-making device adapted to be actuated by the temperature generated by said burner, a set of relays connected with said contact-making device, a common armature for said set of relays, an arm on said armature connected at one end to said lever, and a pin engaging a slot in one of said members for adjusting the connection between said arm and lever.

10. In a temperature-control system for a furnace having a plurality of burners, in combination for at least one of said burners, a supply pipe to said burner, a control valve in said pipe, an actuating member detachably and adjustably secured to said valve, an electric contact device responsible to the temperature generated by said burner, a set of relays connected with said contact device, a common armature for said set of relays, and an adjustable connection between said armature and said actuating member.

11. In a temperature-control system for a furnace having a plurality of burners, in combination for at least one of said burners, supply pipes for fuel and air to said burner, control valves in said pipes, threaded operating spindles on said valves, levers detachably and adjustably connected to said spindles, a contact-making device adapted to be actuated by the temperature of the furnace, a set of relays connected with said contact-making device, a common armature for each set of relays, an arm on each of said armatures connected at one end to one of said levers, and a pin engaging a slot in one of said members for adjusting the connection between said arm and lever.

KARL EINAR LUNDBERG.